3,302,468
VEHICLE TRANSMISSION MECHANISMS
John Thomas Matthew Wright, Southport, England, assignor to Joseph Lucas (Industries) Limited, Birmingham, England
Filed Nov. 13, 1964, Ser. No. 410,849
1 Claim. (Cl. 74—15.8)

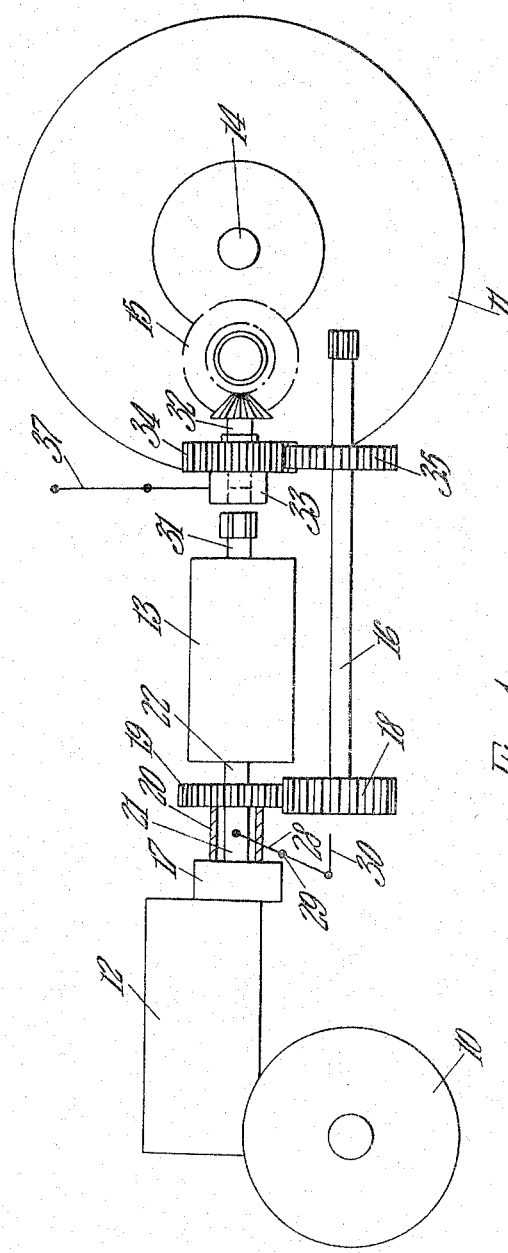

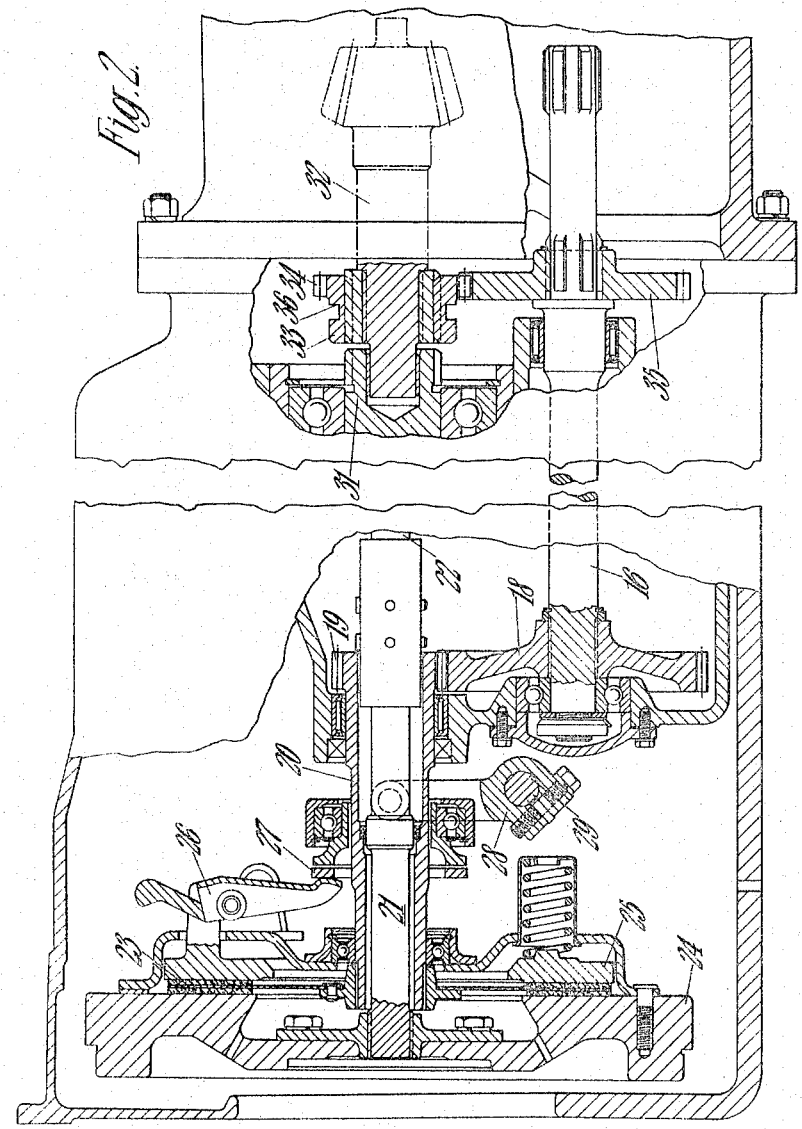

This invention relates to vehicles of the kind provided with an hydraulically operable transmission mechanism interposed between an engine and an input member of a driven axle of the vehicle, and incorporating a power take-off shaft arranged to be connected to the engine through a clutch.

The object of this invention is to provide such a vehicle in a form in which the engine of the vehicle can be connected to the input member other than through the hydraulically operable transmission mechanism.

According to the invention, apparatus for use in a vehicle of the kind specified comprises a clutch means mounted intermediate the transmission mechanism and the input member and arranged, in a first position, to connect the input member with the transmission mechanism, and in a second position, to connect the input member with the power take off shaft.

The invention will now be described with reference to a specific example shown in the accompanying drawings in which:

FIGURE 1 is a schematic representation of an agricultural tractor vehicle, and

FIGURE 2 is an enlarged view of the apparatus to which the invention is applied.

In this example FIGURE 1 shows a vehicle having front and rear wheels indicated by numerals 10 and 11 respectively. The rear wheels 11 are driven by an engine 12 the drive normally being through a transmission mechanism 13 to an axle 14 having a differential mechanism indicated generally at 15. The transmission mechanism, which forms no part of the present invention, is preferably of the kind including a variable stroke swash plate type motor, having an input shaft which is connected to the engine 12 of the tractor and a variable stroke swash plate hydraulic motor which is supplied with motive fluid by the pump (these parts not being shown in the drawings).

The vehicle also has a power take-off shaft 16 for driving various forms of machine from the tractor engine 12.

When it is desired to make use of the power take-off shaft 16, whilst the engine is running it is necessary to engage a clutch indicated at 17 in FIGURE 1. Referring to FIGURE 2, it will be seen that the power take-off shaft 16 carries a gear wheel 18 which is in mesh with a toothed annulus 19 formed on a tubular shaft 20 which is concentric with a shaft 21 forming the output shaft from the engine 12, this shaft 21 being connected to an input shaft 22 to the transmission mechanism 13.

The tubular shaft 20 carries a clutch plate 23 which is capable of being gripped between a member 24 and a spring loaded plate 25. A clutch operating mechanism comprises a lever 26 one arm of which is connected to the plate 25 and the other arm of which bears against a thrust ring 27 which can be moved axially of the shafts 20 and 21 by means of a lever 28 mounted on a rod 29, to which is also connected a hand or foot operated mechanism indicated generally at 30 in FIGURE 1.

From the opposite end of the transmission mechanism 13 extends an output shaft 31, the end of which forms a bearing for an input member 32 of the differential mechanism 15. The output shaft 31 is externally splined at its free end, this splined end being engageable by a corresponding internal splined portion of an axially slidable sleeve 33 having an external toothed annulus 34 which can mesh with a gear wheel 35 on the power take-off shaft 16. The sleeve 33 is slidably engaged on a splined portion on the input member 32 of the differential mechanism and can be wholly accommodated on this portion or form a connector between this portion and the splined end of the output shaft 31 of the transmission mechanism 13. The sleeve 33 has an external annular groove 36 which is engaged by a forked lever (not shown) which is connected to a linkage (indicated by numeral 37 on FIGURE 1) whereby the sleeve may be made to slide.

In use, this assembly forms a clutch means which can occupy a first position in which the sleeve 33 connects the output shaft 31 of the transmission mechanism to the input shaft 32 of the differential mechanism and in this position the toothed annulus 34 is out of mesh with the gear 35 on the power take-off shaft 16. Actuation of the linkage 37 moves the sleeve 33 to a second position in which drive is disconnected from the transmission mechanism to the differential mechanism and the gear 35 is in mesh with the toothed annulus 34. In this position drive from the engine 12 is transmitted through the clutch 17 and power take-off shaft 16 to the differential mechanism.

In the event of failure of the conventional engine starting arrangement, it is possible to start the engine by towing the vehicle. Furthermore this arrangement is particularly useful in the event of failure of the transmission mechanism, as the clutch sleeve 33 can be moved to its second position to permit the tractor to be driven under the control of the accelerator and clutch 17.

Having thus described my invention, what I claim as new and desire to secure by Letters Patent is:

A vehicle transmission apparatus comprising an engine having a driven member and a driven shaft, a hydraulically operable transmission mechanism having an output shaft, and an input shaft connected to and continuously driven by the engine driven shaft, a power take-off shaft, a sleeve arranged concentrically about the engine driven shaft, gearing between the sleeve and power take-off shaft, a first clutch means arranged between said engine driven member and said sleeve, a driven axle, an input member for said driven axle, a second clutch means splined on said input member engageable with said transmission output shaft and gear means on said power take-off shaft and said second clutch means operable when said second clutch means is out of engagement with said transmission output shaft to provide a drive connection between said sleeve and the power take-off shaft to the input member when the first clutch means connects the sleeve to the engine driven member.

References Cited by the Examiner
UNITED STATES PATENTS 2,347,352  4/1944  Lapsley _____ 74—15.66 X
2,945,382  7/1960  Ritter et al. _____ 74—15.63 X MILTON KAUFMAN, *Primary Examiner.*